L. E. WATERMAN.
PLOW.
APPLICATION FILED APR. 17, 1914.
1,170,585.
Patented Feb. 8, 1916.
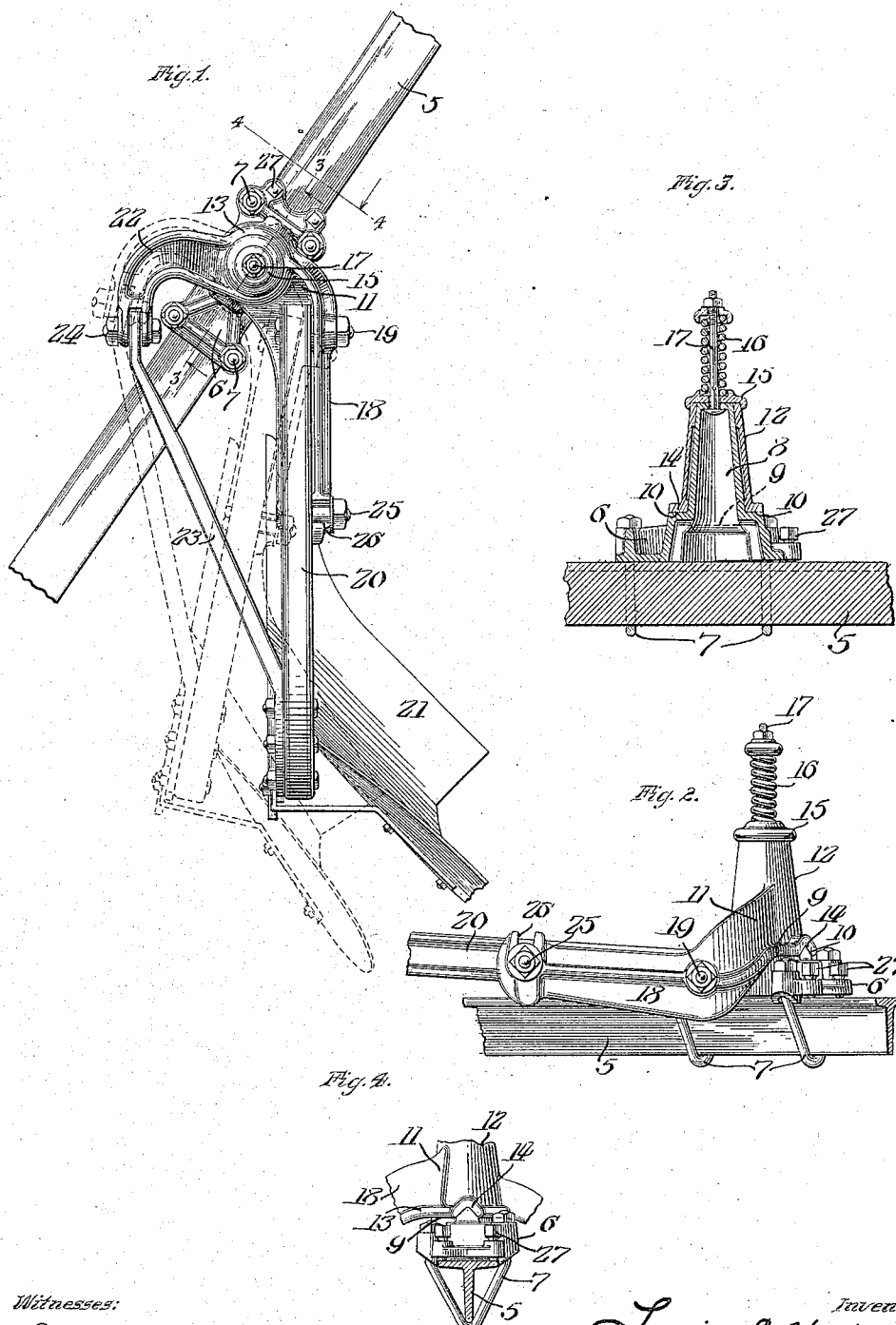

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

PLOW.

1,170,585.

Specification of Letters Patent.

Patented Feb. 8, 1916.

Application filed April 17, 1914. Serial No. 832,570.

*To all whom it may concern:*

Be it known that I, LEWIS E. WATERMAN, a citizen of the United States, residing at Rockford, in the county of Winnebago and State of Illinois, have invented certain new and useful Improvements in Plows, of which the following is a specification.

This invention relates to agricultural implements, more particularly to plows, and which embody in their draft structure a breakable joint, the joint being broken by undue stress or strain upon the working implement parts in direction contrary to the working operation of said parts.

One of the primary objects of my invention is to provide improved means for so pivotally mounting a plurality of plow beams upon a draft frame adapted to be power drawn, that the draft of the beams will be from a point relatively close to the frame and the beams may swing laterally and vertically during operation to avoid obstructions in their paths.

Another object of my invention is to provide in the draft structure of an implement, a joint to maintain the implement normally in its inoperative position and to allow the implement to move to different relative positions against a certain force; further, to utilize said force to move the implement back to its said normal position; and more particularly, to embody in said joint relatively movable associated inclined faces held associated by a spring force, breaking of said joint being by relative movement of said faces in a direction angular to their plane whereby resistance is caused by said movement.

A further object is to embody the said inclined face structure in an implement with an improved mounting adapted to allow the implement to be displaced horizontally, and to provide improved means for allowing the implement to move vertically out of its working position.

A further object is to provide a novel means for mounting a plow beam in a joint of the above character.

In the accompanying drawings: Figure 1 is a plan view of a mold-board plow embodying my improvements. Fig. 2 is a side elevational view of the connection between the plow beam and a draft frame member. Fig. 3 is a vertical sectional view through said connection as taken on the line 3—3 of Fig. 1. Fig. 4 is a vertical sectional view taken on the line 4—4 of Fig. 1.

My invention as illustrated in the drawings, pertains mainly to the manner of connecting a plow beam to a frame member, such a frame as is adapted to draw a plurality of similarly connected plows. The said connection of the plow beam maintains the plow normally at a fixed relation to the frame during plowing operation; and when the plow encounters an obstruction the beam and plow would be laterally displaced according to the nature of said obstruction, and would resume its normal position after the obstruction has been passed. Should the plow be imparted a lifting movement it would rise accordingly through means of a separate movable connection.

A T-beam 5 constitutes a member of a draft frame to which a plurality of plow beams are adapted to be connected. A bracket 6 bolted to the beam 5 through V-bolts 7 has formed thereon a frusto-conical head 8 arranged on a vertical axis, the head having at its base a flanged annular bearing face 9 which has raised V-shaped faces 10 formed at diametrically opposite sides thereof. This head forms the pivot on which a plow beam is mounted to swing laterally relatively to the line of draft. A beam-bracket 11 is formed with a tubular cap 12 which fittingly engages the head 8 to rotate thereon and has a flanged base 13 formed with V-shaped recesses 14, said base and recesses conforming with the faces 9 and 10. The bracket is movable axially against a cap 15 which is yieldingly depressed by a coiled spring 16 mounted on a bolt 17 connected with the head 8, the spring being interposed between an end of said bolt and the cap 15. The beam-bracket is formed with a beam-arm 18 extending rearwardly in the line of draft, and a beam 20 having a mold-board plow 21 is pivotally attached at 19 to said arm. The beam-bracket is formed with an arm 22 extending laterally from its cap 12 and arm 18, and a brace-rod 23 bolted fixedly to the rear end of the beam is pivotally connected at 24 to the end of said arm 22, said pivot 24 being co-axial with the pivot 19. The beam has a member in the form of a laterally extending bolt 25 which rests in the slotted rear end 26 of the arm 18, whereby the lowered position of the plow is limited but the plow may move upwardly swung upon its pivots 19 and 24. Set-screws 27 are mounted in the bracket to lock the same fixedly with the frame 5.

During plowing operation the plow beam will be carried in line with the line of draft as shown in full lines in Fig. 1, maintained so by the associated inclined faces 10 and 14 and the action of spring 16 upon said faces. Should the plow encounter upon either side any obstruction such that might damage the plow or its connections if there were no retracting movement of either encountered member, the plow would swing laterally to avoid the obstruction, such movement being shown in dotted lines in Fig. 1. To effect this beam swinging movement the force of the obstruction must be great enough to overcome the resistance of the spring force urging the inclined faces together, which faces since their relative movement is angular to their plane of incline, add to the resistance to be overcome. The ordinary displacements of the beam do not dislocate entirely the association of the V-shaped faces, so that when the obstruction is passed, the beam, assisted by the action of spring 16 and by the draft, resumes its normal position. Should the beam be displaced laterally to a sufficient degree to dislocate said faces the force of the plow suction, created by the plow-draft and operation, would swing the beam back into its normal position. The lowered working position of the plow is limited by the bolt 25 being stopped by the lower end of the slot 26 in arm 18, but the plow may rise over an obstruction because of the pivotal mounting of the beam at 19—24 and the capability of the bolt 25 to rise.

It will be noted that through the large bearing surface afforded in the vertical pivot axis of the beam and its peculiar manner of resistance to lateral swinging movement, a very substantial structure is obtained that insures the objects above set forth; and also that the plow beam is strengthened and facilitated in transferring its lateral movement, through the means of the brace-bar 23 by reason of its relation to the frame beam-pivot.

I claim as my invention:

1. In combination, a draft frame, an upright bearing-post bracket mounted fixedly above and upon the rear portion of the draft frame, a sleeve rotatably mounted upon the bearing-post, means coöperative between the base portion of the sleeve and the bearing-post bracket for normally holding the sleeve from rotating, means for resiliently opposing rotation of the sleeve, the sleeve having formed integrally therewith an arm extending rearwardly and downwardly therefrom beyond the draft frame, a plow beam connected at its forward end to the lower end of said arm, and a plow attached to the rear end of the plow beam.

2. In combination, a draft frame, an upright bearing-post bracket mounted fixedly above and upon the rear portion of the draft frame, a sleeve rotatably mounted upon the bearing post, means coöperative between the base portion of the sleeve and the bearing-post bracket for normally holding the sleeve from rotating, means for resiliently opposing rotation of the sleeve, the sleeve having formed integrally therewith an arm extending rearwardly and downwardly therefrom beyond the draft frame, and then rearwardly from its lowermost point, a plow beam pivotally connected on a horizontal axis at its forward end to said arm at the forward end of its lower portion, means at the rear end portion of said arm for permitting the plow beam to swing upwardly on its pivot but limiting the downward swinging movement thereof, and a plow attached to the rear end of the plow beam.

3. In combination, a draft frame, an upright bearing-post mounted above and upon the rear portion of said frame, a bracket having a sleeve rotatably mounted upon said bearing-post, means coöperative between the base portion of the sleeve and the bearing-post bracket for normally holding the sleeve from rotating, means for resiliently opposing rotation of the sleeve, the sleeve having an arm portion located at the rear of said sleeve in a general horizontal plane below the same and extending in the line of draft, a plow beam pivotally connected at its forward end on a horizontal axis to the forward end portion of said arm, means at the rear of said end portion of the arm for limiting the downward pivotal movement of the same and a plow attached to the rear end of the plow beam.

4. In combination, a draft frame, a bracket mounted thereon having an upstanding bearing-post, a sleeve-shaped bracket revolubly mounted on said bearing-post and having two arms extending rearwardly from the sleeve portion unequal distances, a plow beam pivotally connected at its forward end on a horizontal axis to one of the arms adjacent to the sleeve, a brace-bar pivotally connected to the other arm coaxial with the beam pivot and being connected to the plow beam bracing the latter, means operative between the end portion of the longer arm and the plow beam for limiting downward pivotal movement of the beam, and a plow attached to the plow beam.

5. In combination, a draft frame, a bracket mounted thereon having an upstanding bearing-post and inclined faces adjacent to the base thereof, a sleeve-shaped bracket revolubly mounted on said bearing-post and formed with inclined faces adapted to coöperate with those on the first named bracket, resilient means normally holding the sleeve bracket from rotating but permitting it to move rotatably by movement of the sleeve faces upon the stationary bracket faces, the sleeve bracket having formed integrally therewith a rearwardly extending portion, a plow beam pivotally connected thereto on a horizontal axis, means operative between said bracket extension and the plow beam for limiting downward pivotal movement thereof, and a plow attached to the plow beam.

6. In combination, a draft frame, a bracket detachably mounted thereon and formed with an upstanding bearing-post, a plow-beam bracket formed with a sleeve fitting revolubly on said bearing-post and formed with a rearwardly extending arm, the draft-frame bracket and plow-beam bracket each having an inclined face associated one with the other whereby upon the latter bracket being moved rotatably it will be moved axially of the bearing-post by reason of said inclined faces, a spring for yieldingly resisting this movement of the plow-beam bracket, a plow beam pivotally connected at its forward end to the arm of the plow-beam bracket on a horizontal axis to permit the rear end of the beam to rise and fall, and a plow connected to the rear end of the plow frame.

7. In combination, a draft frame having a rear member extending diagonally across the line of draft, a bracket mounted thereon having an upstanding bearing-post, a plow-beam bracket journaled on the bearing-post, means for resiliently holding the plow-beam bracket in a predetermined position against rotation but permitting the bracket to move rotatively, said plow-beam bracket having an arm portion extending rearwardly and downwardly therefrom beyond the rear frame member and then rearwardly, a plow-beam pivotally connected on a horizontal axis to the said arm at the lower forward portion thereof, means at the rear end of the arm coöperating with the beam for limiting vertical swinging movement thereof, and a plow attached to the rear end of the beam.

In testimony whereof I have hereunto set my hand in presence of two subscribing witnesses.

LEWIS E. WATERMAN.

Witnesses:
N. F. LEVINGS,
R. A. HEMENWAY.

Copies of this patent may be obtained for five cents each, by addressing the "Commissioner of Patents, Washington, D. C."